Jan. 19, 1932.  G. H. HUFFERD ET AL  1,841,735
TUBULAR FRONT AXLE
Filed June 5, 1929
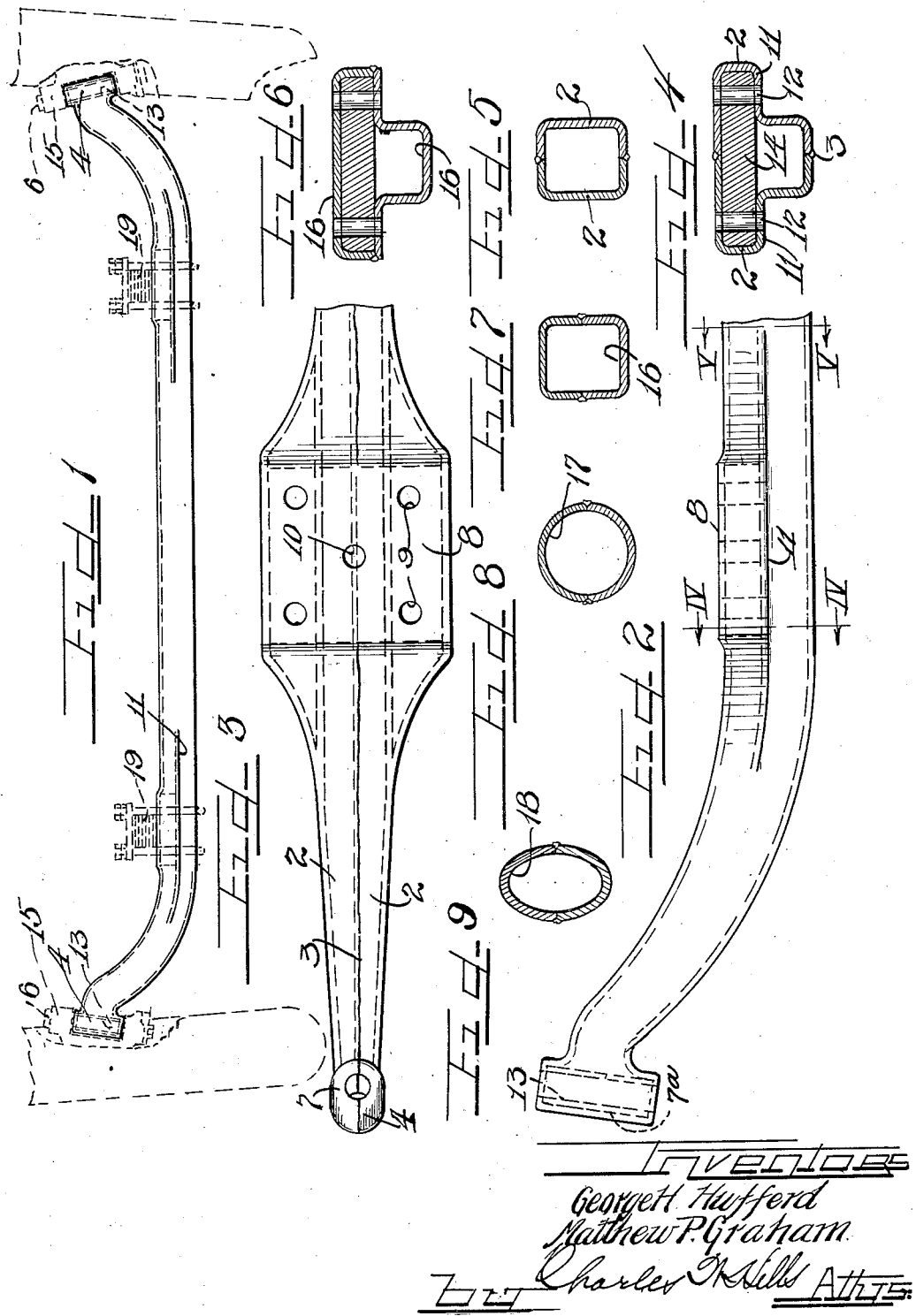

Patented Jan. 19, 1932

1,841,735

UNITED STATES PATENT OFFICE

GEORGE H. HUFFERD AND MATTHEW P. GRAHAM, OF DETROIT, MICHIGAN, ASSIGNORS TO THOMPSON PRODUCTS, INCORPORATED, OF DETROIT, MICHIGAN, A CORPORATION OF OHIO

TUBULAR FRONT AXLE

Original application filed December 19, 1925, Serial No. 76,457. Divided and this application filed June 5, 1929. Serial No. 368,541.

This invention relates to a one-piece tubular member having relatively thin walls and a substantially solid end, and more particularly to front axle centers for automobiles.

The front axle center is that part of an automobile to which the stub axles of the front wheels are pivoted and which, with the rear axle, sustain the sprung weight of the car. Since the front axle center sustains about one-half the weight of the car and since it is subjected in all cases to the static load, also, where four wheel brakes are employed, to torsional stress at its outer ends, it must be very strong. As commonly constructed, this part is formed of an I-beam which must necessarily be of considerable weight. In order to make this part lighter and thus decrease the unsprung weight of the car, a tubular axle center has been used having an intermediate tubular part and tubular end sections with solid ends welded together. Such a construction is too weak effectively to withstand the stresses to which such a part is subjected in use and it also involves an increase in the cost of manufacture.

It is therefore an object of this invention to provide a tubular front axle of relatively light yet strong construction, capable of being manufactured at a relatively decreased cost.

Other and further important objects of this invention will be apparent from the disclosures in the specification and the accompanying drawings.

This invention (in a preferred form) is illustrated in the drawings and hereinafter more fully described.

On the drawings:

Figure 1 is a front elevation of an axle center illustrating a preferred embodiment of our invention;

Figure 2 is an enlarged elevational view of the end portion thereof;

Figure 3 is a fragmentary top plan view;

Figure 4 is a sectional view taken substantially on line IV—IV of Figure 2;

Figure 5 is a sectional view taken substantially on line V—V of Figure 2;

Figure 6 is a sectional view similar to Figure 4 of a slight modification, in which the mating sections are so constructed as to adapt them to be joined together with the joints in a horizontal plane when in use;

Figure 7 is a sectional view similar to that of Figure 5 of the modified form shown in Figure 6;

Figure 8 is a view similar to Figure 7 illustrating an axle center whose main portion is circular in cross section;

Figure 9 is a sectional view similar to Figure 8 wherein the main portion is oval in cross section.

The reference numeral 1 indicates a tubular axle center, composed of two mating sections 2—2 of any suitable cross section and welded together at abutting edges as indicated at 3. Said tubular axle center 1 is provided with substantially solid ends 4 having transverse apertures 5 adapted to receive pintles 6 connected with the front steering knuckles 15 of an automobile.

Said apertures 5 are preferably arranged at a slight angle to a horizontal plane passing through the longitudinal axis of the main central part of the axle center.

The mating sections may be of many different shapes, some of which are illustrated in Figures 5, 7, 8 and 9, and the same section may have one shape for a part of its length and another shape at a different part, for purposes hereinafter indicated. As indicated in Figure 7 each section 16 is of general U-shape; as indicated in Figure 8 each section 17 is of semi-cylindrical shape; and as indicated in Figure 9, each section 18 is of semi-oval shape.

The process employed in forming axle centers of this type is well known and the art of forming will therefore not be described, reference being made only incidentally to the steps of the process.

A sheet of metal is rolled or pressed into channel forms as defined in our Patent No. 1,721,695 to provide the mating sections 2—2, with integral, semi-cylindrical ends 4, which ends mate to define the pintle receiving apertures 5, bounded by the end walls 7 and side walls 7ª, when said sections are positioned in assembled relation. When the section is formed by rolling, it is rolled straight and afterward bent to shape at the ends.

The upper section is preferably provided with enlarged portions 8 at the points where the spring pads 19 are to have their seats. Said enlarged portions 8 are provided with a plurality of bolt receiving apertures 9 and a central dowel receiving aperture 10. The mating lower section is provided with flanges 11 of corresponding dimensions provided with similar bolt receiving apertures 12.

After so forming the mating sections, the edges of the channels are placed together and secured by welding, as indicated at 3. The joints are arranged as described so as to be in vertical or horizontal plane when the article is in use, as conditions appear to demand. In an axle center it is generally preferable to arrange the joints in a horizontal plane, which is a neutral zone (Figure 6) the upper section being in compression and the lower section in tension, although this arrangement is not essential.

The cup-shaped cylindrical end portions 4 of the mating sections with the end walls 7 form retainers for any suitable bearing members 13, in which the pintles 6 of the steering knuckle is mounted, as above described.

The enlarged portion 8 of the upper half section, together with the flanges 11 of the lower half section, form a cavity in which is placed a filling block 14, which serves to prevent the bolts securing the spring pads to the axle center from distorting the stamping.

It will be apparent from the above description that we have produced an axle center, or like metal part, which is light, yet strong, and which can be manufactured at low cost.

This application is a division of our application Serial No. 76,457, filed December 19, 1925, which has now matured into Patent No. 1,721,695.

We are aware that many changes may be made and numerous details of construction may be varied through a wide range without departing from the principles of this invention, and we, therefore, do not purpose limiting the patent granted hereon otherwise than necessitated by the prior art and the appended claims.

The invention is claimed as follows:

1. An axle for a vehicle, said axle comprising an elongated tubular member having its ends shaped to provide transversely extending cylindrical members with inturned annular flanges partially closing each end of said cylindrical members.

2. An axle for a vehicle, said axle having integrally formed transversely extending cylindrical end portions with integral inturned annular flanges partially closing each end of said cylindrical end portions.

3. An axle for a vehicle, said axle comprising an elongated tubular member formed of two sheet metal, semi-tubular, longitudinally mating sections, the ends of each section being bent to provide cylindrical transversely extending members with closing end walls when said sections are positioned in assembled relation, said end walls being centrally apertured.

GEORGE H. HUFFERD.
MATTHEW P. GRAHAM.